US011856993B2

(12) United States Patent
Mironov et al.

(10) Patent No.: US 11,856,993 B2
(45) Date of Patent: Jan. 2, 2024

(54) AEROSOL-GENERATING SYSTEM COMPRISING A FLUID PERMEABLE SUSCEPTOR ELEMENT

(71) Applicant: Philip Morris Products S.A., Neuchatel (CH)

(72) Inventors: Oleg Mironov, Neuchatel (CH); Ihar Nikolaevich Zinovik, Peseux (CH); Michel Thorens, Moudon (CH)

(73) Assignee: Philip Morris Products S.A., Neuchatel (CH)

(*) Notice: Subject to any disclaimer, the term of this patent is extended or adjusted under 35 U.S.C. 154(b) by 0 days.

(21) Appl. No.: 18/174,171

(22) Filed: Feb. 24, 2023

(65) Prior Publication Data

US 2023/0263231 A1 Aug. 24, 2023

Related U.S. Application Data

(60) Continuation of application No. 17/708,647, filed on Mar. 30, 2022, now Pat. No. 11,606,979, which is a (Continued)

(30) Foreign Application Priority Data

May 21, 2014 (EP) .................................... 14169249

(51) Int. Cl.
*A24F 40/465* (2020.01)
*A24F 40/42* (2020.01)

(Continued)

(52) U.S. Cl.
CPC ............ *A24F 40/465* (2020.01); *A24F 40/42* (2020.01); *A24F 40/90* (2020.01); *H05B 6/108* (2013.01);

(Continued)

(58) Field of Classification Search
CPC ........ A24F 40/465; A24F 40/46; A24F 40/10; A24F 40/20; A24F 40/42; A24F 40/30;

(Continued)

(56) References Cited

U.S. PATENT DOCUMENTS 3,651,240 A 3/1972 Kirkpatrick
3,812,908 A 5/1974 Coville et al.

(Continued)

FOREIGN PATENT DOCUMENTS

CN 1126426 A 7/1996
CN 1633247 A 6/2005

(Continued)

OTHER PUBLICATIONS

International Search Report and Written Opinion of the International Searching Authority dated Sep. 4, 2015 in PCT/EP15/060731 Filed May 14, 2015.

(Continued)

*Primary Examiner* — Marcus E Harcum
(74) *Attorney, Agent, or Firm* — Oblon, McClelland, Maier & Neustadt, L.L.P.

(57) ABSTRACT

A cartridge for an electrically heatable aerosol-generating system is provided, the system including an aerosol-generating device, the cartridge configured to be used with the device, the device including a device housing defining a cavity to receive the cartridge, an inductor coil around or adjacent to the cavity, and a power supply connected to the coil and to provide a high-frequency oscillating current; the cartridge including: a cartridge housing to engage the device housing and containing an aerosol-forming substrate, the cartridge housing having an external surface, at least part of which is formed by a fluid permeable susceptor element that is electrically isolated from any other electrically conductive components; a first capillary material in the cartridge hous- (Continued)

ing in contact with the susceptor element; and a second capillary material in the cartridge housing in contact with the first material, the first material having a higher thermal decomposition temperature than the second material.

17 Claims, 9 Drawing Sheets

Related U.S. Application Data continuation of application No. 17/063,809, filed on Oct. 6, 2020, now Pat. No. 11,311,051, which is a continuation of application No. 16/444,651, filed on Jun. 18, 2019, now Pat. No. 10,834,972, which is a division of application No. 15/312,062, filed as application No. PCT/EP2015/060730 on May 14, 2015, now Pat. No. 10,375,994.

(51) Int. Cl.
*A24F 40/90* (2020.01)
*H05B 6/10* (2006.01)
*H05B 6/36* (2006.01)
*H05B 6/38* (2006.01)
*A24F 40/10* (2020.01)

(52) U.S. Cl.
CPC ............... *H05B 6/362* (2013.01); *H05B 6/38* (2013.01); *A24F 40/10* (2020.01)

(58) Field of Classification Search
CPC .......... A24F 40/40; A24F 40/44; A24F 40/48; A24F 40/60; H05B 6/38; H05B 6/362; H05B 6/108; A61M 15/06; A61M 11/042; A61M 11/044
See application file for complete search history.

(56) References Cited

U.S. PATENT DOCUMENTS

| | | | |
|---|---|---|---|
| 3,967,093 | A | 6/1976 | Oi |
| 4,091,264 | A | 5/1978 | Sarcia |
| 5,613,505 | A | 3/1997 | Campbell et al. |
| 5,649,554 | A | 7/1997 | Sprinkel et al. |
| 5,878,752 | A | 3/1999 | Adams et al. |
| 6,042,414 | A | 3/2000 | Kunert |
| 6,194,828 | B1 | 2/2001 | Kohne et al. |
| 8,393,331 | B2 | 3/2013 | Hon |
| 9,137,884 | B2 | 9/2015 | Vinogradov et al. |
| 9,289,014 | B2 | 3/2016 | Tucker et al. |
| 9,603,389 | B2 | 3/2017 | Chen |
| 9,814,265 | B2 | 11/2017 | Rinker |
| 9,820,512 | B2 | 11/2017 | Mironov |
| 10,219,543 | B2 | 3/2019 | Gill |
| 10,375,990 | B2 | 8/2019 | Lord |
| 2006/0232926 | A1 | 10/2006 | Homer et al. |
| 2008/0122367 | A1 | 5/2008 | Vinogradov et al. |
| 2008/0257367 | A1 | 10/2008 | Paterno et al. |
| 2009/0126745 | A1 | 5/2009 | Hon |
| 2010/0313901 | A1 | 12/2010 | Fernando et al. |
| 2011/0126848 | A1 | 6/2011 | Zuber |
| 2011/0265806 | A1 | 11/2011 | Alarcon et al. |
| 2012/0186594 | A1 | 7/2012 | Liu |
| 2012/0234315 | A1 | 9/2012 | Li et al. |
| 2013/0081642 | A1 | 4/2013 | Safari |
| 2013/0213419 | A1 | 8/2013 | Tucker et al. |
| 2013/0220315 | A1 | 8/2013 | Conley |
| 2014/0096781 | A1 | 4/2014 | Sears |
| 2014/0117049 | A1 | 5/2014 | Varga |
| 2014/0182611 | A1 | 7/2014 | Liu |
| 2014/0238423 | A1 | 8/2014 | Tucker et al. |
| 2014/0261487 | A1 | 9/2014 | Chapman |
| 2014/0305454 | A1 | 10/2014 | Rinker |
| 2014/0346689 | A1 | 11/2014 | Dubief |
| 2014/0366898 | A1 | 12/2014 | Monsees |
| 2015/0223292 | A1 | 8/2015 | Duffield |
| 2015/0245660 | A1 | 9/2015 | Lord |
| 2015/0245669 | A1 | 9/2015 | Cadieux |
| 2015/0320116 | A1 | 11/2015 | Bleloch |
| 2016/0021934 | A1 | 1/2016 | Cadieux |
| 2016/0120221 | A1 | 5/2016 | Mironov et al. |
| 2016/0157525 | A1 | 6/2016 | Tucker et al. |
| 2016/0213065 | A1 | 7/2016 | Wensley |
| 2016/0353802 | A1 | 12/2016 | Malgat |
| 2017/0027226 | A1 | 2/2017 | Mironov |
| 2017/0027233 | A1 | 2/2017 | Mironov |
| 2017/0035113 | A1 | 2/2017 | Thorens |
| 2017/0071250 | A1 | 3/2017 | Mironov |
| 2017/0071251 | A1 | 3/2017 | Goch |
| 2017/0079329 | A1 | 3/2017 | Zitzke |
| 2017/0079330 | A1 | 3/2017 | Mironov et al. |
| 2017/0105452 | A1 | 4/2017 | Mironov |
| 2017/0119047 | A1 | 5/2017 | Blandino |
| 2017/0347714 | A1 | 12/2017 | Metz |
| 2018/0289067 | A1 | 10/2018 | Courbat |
| 2019/0142066 | A1 | 5/2019 | Gill |
| 2019/0321570 | A1 | 10/2019 | Rubin |

FOREIGN PATENT DOCUMENTS

| | | | |
|---|---|---|---|
| CN | 101116542 | A | 2/2008 |
| CN | 201079011 | Y | 7/2008 |
| CN | 201445686 | U | 5/2010 |
| CN | 201571500 | U | 9/2010 |
| CN | 102014677 | A | 4/2011 |
| CN | 102483981 | A | 5/2012 |
| CN | 103338665 | A | 10/2013 |
| CN | 103689812 | A | 4/2014 |
| EA | 013046 | B1 | 2/2010 |
| EP | 1 989 946 | A1 | 11/2008 |
| EP | 2 444 112 | A1 | 4/2012 |
| GB | 2 504 732 | A | 2/2014 |
| JP | 8-511175 | A | 11/1996 |
| JP | 2006-524494 | A | 11/2006 |
| JP | 2012-529936 | A | 11/2012 |
| JP | 2017-506915 | A | 3/2017 |
| KR | 10-2010-0021595 | A | 2/2010 |
| KR | 10-1062248 | B1 | 8/2011 |
| KR | 10-2013-0031550 | A | 3/2013 |
| KZ | 28017 | B | 12/2013 |
| TW | 201330884 | A | 8/2013 |
| WO | 95/27411 | A1 | 10/1995 |
| WO | 97/48293 | A1 | 12/1997 |
| WO | 2008/069157 | A1 | 6/2008 |
| WO | 2009/132793 | A | 11/2009 |
| WO | 2010/045670 | A1 | 4/2010 |
| WO | 2013/045582 | A2 | 4/2013 |
| WO | 2013/083638 | A1 | 6/2013 |
| WO | 2013/102613 | A2 | 7/2013 |
| WO | WO 2013/102609 | A2 | 7/2013 |
| WO | WO 2014/023965 | A1 | 2/2014 |
| WO | 2014/048745 | A1 | 4/2014 |
| WO | 2015/131058 | A1 | 9/2015 |
| WO | 2015/175568 | A1 | 11/2015 |

OTHER PUBLICATIONS

International Search Report and Written Opinion dated Sep. 14, 2015 in PCT/EP2015/060727 filed May 14, 2015.
Written Opinion dated Oct. 1, 2015 in Singaporean Patent Application No. 11201403801 R.
Office Action dated Mar. 24, 2016 in Korean Patent Application No. 10-2015-7034472 (submitting English translation only).
Office Action dated Mar. 31 , 2016 in Korean Patent Application No. 10-2014-7021388 (submitting English translation only).
Office Action dated Jul. 19, 2016 in Japanese Patent Application No. 2015-563166 (submitting English translation only).
Combined Chinese Office Action and Search Report dated Apr. 1, 2017 in Patent Application No. 2015800006655 (submitting English language translation only).

(56) References Cited

OTHER PUBLICATIONS

Sigma Aldrich Mesh Comparison Chart date stamped Jul. 21, 2017 www.sigmaaldrich.com/chemistry/stockroom-reagents/learning-center/technical-library/particle-size-conversion.printerview.html.
International Search Report and Written Opinion dated Sep. 2, 2015 in PCT/EP2015/060730 filed May 14, 2015.
Combined Chinese Office Action and Search Report dated Dec. 28, 2018 in corresponding Chinese Patent Application No. 2015800230383 (with English Translation), 18 pages.
Office Action dated Jun. 20, 2019 in Japanese Patent Application No. 2016-568583, 4 pages (with English translation).
Combined Chinese Office Action and Search Report dated Jan. 21, 2022 in Chinese Patent Application No. 2020101196166 (with English translation), 11 pages.
Russian Office Action and Search Report dated Jun. 7, 2022, in Russian Patent Application No. 2019103379 (with English translation), 20 pages.
Decision to Grant a Patent dated Sep. 26, 2023 issued in Japanese Patent Application No. 2022-176908 filed Nov. 4, 2022, with English Translation, total 4 pages.
Korean Notice of Allowance dated Oct. 7, 2023 issued in South Korean Patent Application No. 10-2022-7045126 filed May 14, 2015, with English Translation, total 5 pages.

AEROSOL-GENERATING SYSTEM COMPRISING A FLUID PERMEABLE SUSCEPTOR ELEMENT

CROSS-REFERENCE TO RELATED APPLICATIONS

This application is a continuation of and claims benefit under 35 U.S.C. § 120 to U.S. application Ser. No. 17/708,647, filed Mar. 30, 2022, which is a continuation of and claims benefit under 35 U.S.C. § 120 to U.S. application Ser. No. 17/063,809, filed Oct. 6, 2020 (now U.S. Pat. No. 11,311,051), which is a continuation of and claims benefit under U.S.C. § 120 to U.S. application Ser. No. 16/444,651, filed Jun. 18, 2019 (now U.S. Pat. No. 10,834,972), which is a divisional of and claims benefit under 35 U.S.C. § 120 to U.S. application Ser. No. 15/312,062, filed on Nov. 17, 2016 (now U.S. Pat. No. 10,375,994), which is a U.S. National Stage application of PCT/EP2015/060730, filed on May 14, 2015, and claims the benefit of priority under 35 U.S.C. § 119 to EP 14169249.1, filed on May 21, 2014, the entire contents of each of which are incorporated herein by reference.

TECHNICAL FIELD

The disclosure relates to aerosol-generating systems that operate by heating an aerosol-forming substrate. In particular the invention relates to aerosol-generating systems that comprise a device portion containing a power supply and a replaceable cartridge portion comprising the consumable aerosol-forming substrate.

DESCRIPTION OF THE RELATED ART

One type of aerosol-generating system is an electronic cigarette. Electronic cigarettes typically use a liquid aerosol-forming substrate which is vapourised to form an aerosol. An electronic cigarette typically comprises a power supply, a liquid storage portion for holding a supply of the liquid aerosol-forming substrate and an atomiser.

The liquid aerosol-forming substrate becomes exhausted in use and so needs to be replenished. The most common way to supply refills of liquid aerosol-forming substrate is in a cartomiser type cartridge. A cartomiser comprises both a supply of liquid substrate and the atomiser, usually in the form of an electrically operated resistance heater wound around a capillary material soaked in the aerosol-forming substrate. Replacing a cartomiser as a single unit has the benefit of being convenient for the user and avoids the need for the user to have to clean or otherwise maintain the atomiser.

However, it would be desirable to be able to provide a system that allows for refills of aerosol-forming substrate that are less costly to produce and are more robust that the cartomisers available today, while still being easy and convenient to use for consumers. In addition it would be desirable to provide a system that removes the need for soldered joints and that allows for a sealed device that is easy to clean.

SUMMARY

In a first aspect, there is provided an electrically heated aerosol-generating system comprising an aerosol-generating device and a cartridge configured to be used with the device, the device comprising: a device housing; an inductor coil positioned around or adjacent to the cavity; and a power supply connected to the inductor coil and configured to provide a high frequency oscillating current to the inductor coil; the cartridge comprising: a cartridge housing configured to engage the device housing and containing an aerosol-forming substrate, the housing having an external surface surrounding the aerosol-forming substrate, at least a portion of the external surface being formed by a fluid permeable susceptor element.

In a second aspect, there is provided a cartridge for use in an electrically heated aerosol-generating system, the electrically heated aerosol-generating system comprising an aerosol-generating device, the cartridge configured to be used with the device, wherein the device comprises a device housing defining a cavity for receiving at least a portion of the cartridge; an inductor coil positioned around or adjacent to the cavity; and a power supply connected to the inductor coil and configured to provide a high frequency oscillating current to the inductor coil; the cartridge comprising a cartridge housing containing an aerosol-forming substrate, the housing having an external surface, at least a portion of the external surface being formed by a fluid permeable susceptor element, wherein the susceptor element is electrically isolated from any other electrically conductive components.

BRIEF DESCRIPTION OF THE DRAWINGS

Embodiments of a system in accordance with the disclosure will now be described in detail, by way of example only, with reference to the accompanying drawings, in which.

DETAILED DESCRIPTION

Figure 1:
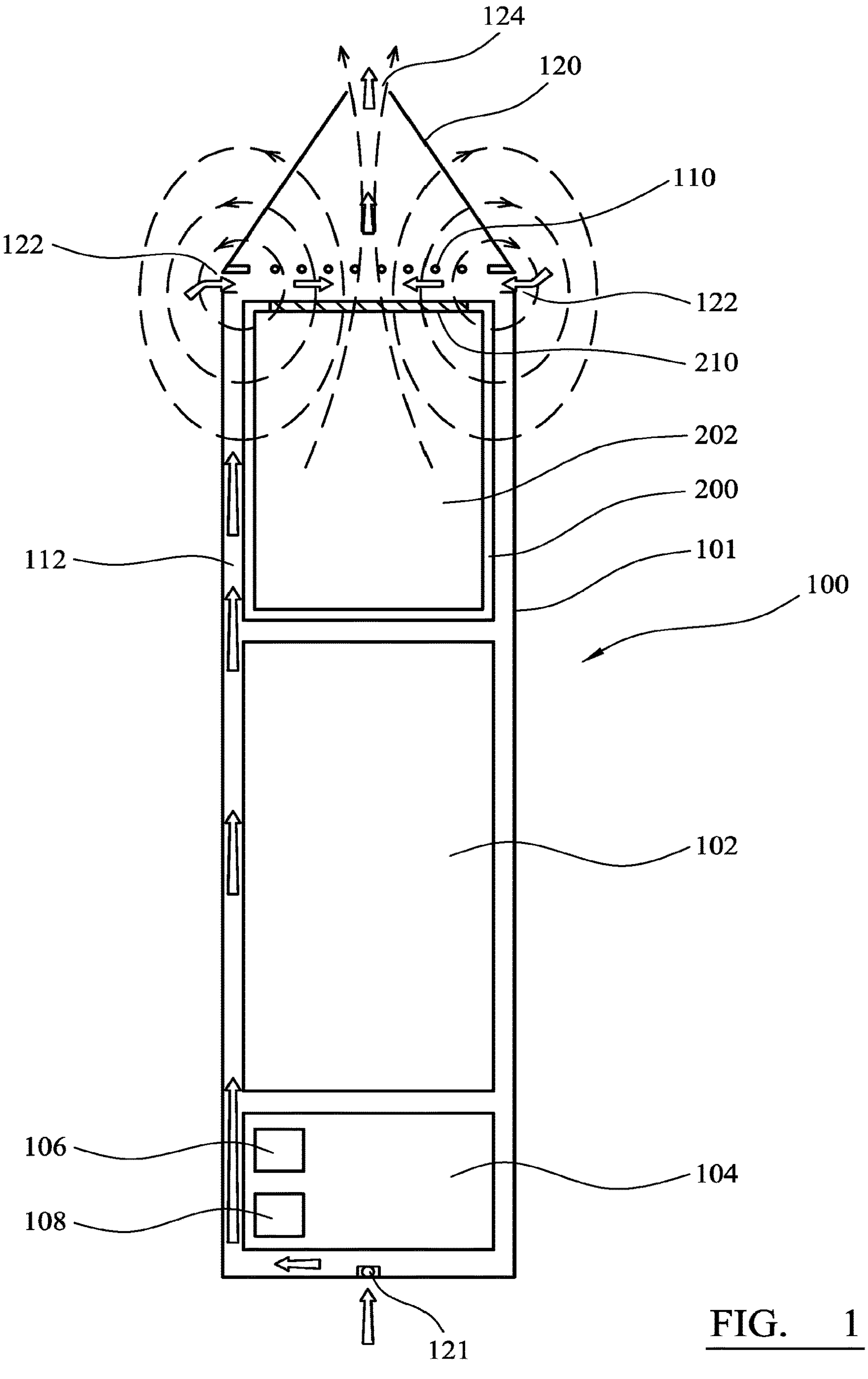
FIG. 1 is a schematic illustration of a first embodiment of an aerosol-generating system, using a flat spiral inductor coil.

In operation a high frequency oscillating current is passed through the flat spiral inductor coil to generate an alternating magnetic field that induces a voltage in the susceptor element. The induced voltage causes a current to flow in the susceptor element and this current causes Joule heating of the susceptor that in turn heats the aerosol-forming substrate. If the susceptor element is ferromagnetic, hysteresis losses in the susceptor element may also generate heat. The vapourised aerosol-forming substrate can pass through the susceptor element and subsequently cool to form an aerosol delivered to a user.

This arrangement using inductive heating has the advantage that no electrical contacts need be formed between the cartridge and the device. And the heating element, in this case the susceptor element, need not be electrically joined to any other components, eliminating the need for solder or other bonding elements. Furthermore, the coil is provided as part of the device making it possible to construct a cartridge that is simple, inexpensive and robust. Cartridges are typically disposable articles produced in much larger numbers than the devices with which they operate. Accordingly reducing the cost of cartridges, even if it requires a more expensive device, can lead to significant cost savings for both manufacturers and consumers.

As used herein, a high frequency oscillating current means an oscillating current having a frequency of between 500 kHz and 30 MHz. The high frequency oscillating current may have a frequency of between 1 and 30 MHz, preferably between 1 and 10 MHz and more preferably between 5 and 7 MHz.

As used herein, a "susceptor element" means a conductive element that heats up when subjected to a changing magnetic field. This may be the result of eddy currents induced in the susceptor element and/or hysteresis losses. Possible materials for the susceptor elements include graphite, molybdenum, silicon carbide, stainless steels, niobium, aluminium and virtually any other conductive elements. Advantageously the susceptor element is a ferrite element. The material and the geometry for the susceptor element can be chosen to provide a desired electrical resistance and heat generation. The susceptor element may comprise, for example, a mesh, flat spiral coil, fibres or a fabric.

As used herein a "fluid permeable" element means an element that allowing liquid or gas to permeate through it. The susceptor element may have a plurality of openings formed in it to allow fluid to permeate through it. In particular, the susceptor element allows the aerosol-forming substrate, in either gaseous phase or both gaseous and liquid phase, to permeate through it.

The susceptor element may be in the form of a sheet that extends across an opening in the cartridge housing. The susceptor element may extend around a perimeter of the cartridge housing.

The device housing may comprise a cavity for receiving at least a portion of the cartridge when the cartridge housing is engaged with the device housing, the cavity having an internal surface. The inductor coil may be positioned on or adjacent a surface of cavity closest to the power supply. The inductor coil may be shaped to conform to the internal surface of the cavity.

The device housing may comprise a main body and a mouthpiece portion. The cavity may be in the main body and the mouthpiece portion may have an outlet through which aerosol generated by the system can be drawn into a user's mouth. The inductor coil may be in the mouthpiece portion or in the main body.

Alternatively a mouthpiece portion may be provided as part of the cartridge. As used herein, the term mouthpiece portion means a portion of the device or cartridge that is placed into a user's mouth in order to directly inhale an aerosol generated by the aerosol-generating system. The aerosol is conveyed to the user's mouth through the mouthpiece portion.

The system may comprise an air path extending from an air inlet to an air outlet, wherein the air path goes through the inductor coil. By allowing the air flow through the system to pass through the coil a compact system can be achieved.

The cartridge may have a simple design. The cartridge has a housing within which the aerosol-forming substrate is held. The cartridge housing is preferably a rigid housing comprising a material that is impermeable to liquid. As used herein "rigid housing" means a housing that is self-supporting.

The aerosol-forming substrate is a substrate capable of releasing volatile compounds that can form an aerosol. The volatile compounds may be released by heating the aerosol-forming substrate. The aerosol-forming substrate may be solid or liquid or comprise both solid and liquid components.

The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may comprise homogenised plant-based material. The aerosol-forming substrate may comprise homogenised tobacco material. The aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers are polyhydric alcohols or mixtures thereof, such as triethylene glycol, 1,3-butanediol and, most preferred, glycerine. The aerosol-forming substrate may comprise other additives and ingredients, such as flavourants.

The aerosol-forming substrate may be adsorbed, coated, impregnated or otherwise loaded onto a carrier or support. In one example, the aerosol-forming substrate is a liquid substrate held in capillary material. The capillary material may have a fibrous or spongy structure. The capillary material preferably comprises a bundle of capillaries. For example, the capillary material may comprise a plurality of fibres or threads or other fine bore tubes. The fibres or threads may be generally aligned to convey liquid to the heater. Alternatively, the capillary material may comprise sponge-like or foam-like material. The structure of the capillary material forms a plurality of small bores or tubes, through which the liquid can be transported by capillary action. The capillary material may comprise any suitable material or combination of materials. Examples of suitable materials are a sponge or foam material, ceramic- or graphite-based materials in the form of fibres or sintered powders, foamed metal or plastics materials, a fibrous material, for example made of spun or extruded fibres, such as cellulose acetate, polyester, or bonded polyolefin, polyethylene, terylene or polypropylene fibres, nylon fibres or ceramic. The capillary material may have any suitable capillarity and porosity so as to be used with different liquid physical properties. The liquid has physical properties, including but not limited to viscosity, surface tension, density, thermal conductivity, boiling point and vapour pressure, which allow the liquid to be transported through the capillary material by capillary action. The capillary material may be configured to convey the aerosol-forming substrate to the susceptor element. The capillary material may extend into interstices in the susceptor element.

The susceptor element may be provided on a wall of the cartridge housing that is configured to be positioned adjacent the inductor coil when the cartridge housing is engaged with the device housing. In use, it is advantageous to have the susceptor element close to the inductor coil in order to maximise the voltage induced in the susceptor element.

An airflow passage may be provided between the inductor coil and the susceptor element when the cartridge housing is engaged with the device housing. Vapourised aerosol-forming substrate may be entrained in the air flowing in the airflow passage, which subsequently cools to form an aerosol.

The inductor coil may be a helical coil or a flat spiral coil. As used herein a "flat spiral coil" means a coil that is generally planar wherein the axis of winding of the coil is normal to the surface in which the coil lies. However, the term "flat spiral coil" as used herein covers coils that are planar, as well as flat spiral coils that are shaped to conform to a curved surface. The use of a flat spiral coil allows for the design of a compact device, with a simple design that is robust and inexpensive to manufacture. The coil can be held within the device housing and need not be exposed to generated aerosol, so that deposits on the coil and possible corrosion can be prevented. The use of a flat spiral coil also allows for a simple interface between the device and a cartridge, allowing for a simple and inexpensive cartridge design.

The flat spiral inductor can have any desired shape within the plane of the coil. For example, the flat spiral coil may have a circular shape or may have a generally oblong shape.

The coil may have a diameter of between 5 mm and 10 mm.

The inductor coil may be positioned on or adjacent a surface of cavity closest to the power supply. This reduces the amount and complexity of electrical connections within the device. The system may comprise a plurality of inductor coils and may comprise a plurality of susceptor elements.

The inductor coil may have a shape matching the shape of the susceptor element.

Advantageously, the susceptor element has a relative permeability between 1 and 40000. When a reliance on eddy currents for a majority of the heating is desirable, a lower permeability material may be used, and when hysteresis effects are desired then a higher permeability material may be used. Preferably, the material has a relative permeability between 500 and 40000. This provides for efficient heating.

The material of the susceptor element may be chosen because of its Curie temperature. Above its Curie temperature a material is no longer ferromagnetic and so heating due to hysteresis losses no longer occurs. In the case the susceptor element is made from one single material, the Curie temperature may correspond to a maximum temperature the susceptor element should have (that is to say the Curie temperature is identical with the maximum temperature to which the susceptor element should be heated or deviates from this maximum temperature by about 1-3%). This reduces the possibility of rapid overheating.

If the susceptor element is made from more than one material, the materials of the susceptor element can be optimized with respect to further aspects. For example, the materials can be selected such that a first material of the susceptor element may have a Curie temperature which is above the maximum temperature to which the susceptor element should be heated. This first material of the susceptor element may then be optimized, for example, with respect to maximum heat generation and transfer to the aerosol-forming substrate to provide for an efficient heating of the susceptor on one hand. However, the susceptor element may then additionally comprise a second material having a Curie temperature which corresponds to the maximum temperature to which the susceptor should be heated, and once the susceptor element reaches this Curie temperature the magnetic properties of the susceptor element as a whole change. This change can be detected and communicated to a microcontroller which then interrupts the generation of AC power until the temperature has cooled down below the Curie temperature again, whereupon AC power generation can be resumed.

The system may further comprise electric circuitry connected to the inductor coil and to an electrical power source. The electric circuitry may comprise a microprocessor, which may be a programmable microprocessor, a microcontroller, or an application specific integrated chip (ASIC) or other electronic circuitry capable of providing control. The electric circuitry may comprise further electronic components. The electric circuitry may be configured to regulate a supply of current to the coil. Current may be supplied to the inductor coil continuously following activation of the system or may be supplied intermittently, such as on a puff by puff basis. The electric circuitry may advantageously comprise DC/AC inverter, which may comprise a Class-D or Class-E power amplifier.

The system advantageously comprises a power supply, typically a battery such as a lithium iron phosphate battery, within the main body of the housing. As an alternative, the power supply may be another form of charge storage device such as a capacitor. The power supply may require recharging and may have a capacity that allows for the storage of enough energy for one or more smoking experiences. For example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of puffs or discrete activations of the inductor coil.

The system may be an electrically operated smoking system. The system may be a handheld aerosol-generating system. The aerosol-generating system may have a size comparable to a conventional cigar or cigarette. The smoking system may have a total length between approximately 30 mm and approximately 150 mm. The smoking system may have an external diameter between approximately 5 mm and approximately 30 mm.

The susceptor element may be in the form of a sheet and extend across an opening in the cartridge housing. The susceptor element may extend around a perimeter of the cartridge housing.

Features described in relation to one aspect may be applied to other aspects of the disclosure. In particular advantageous or optional features described in relation to the first aspect of the disclosure may be applied to the second aspect of the invention.

The embodiments shown in the figures all rely on inductive heating. Inductive heating works by placing an electrically conductive article to be heated in a time varying magnetic field. Eddy currents are induced in the conductive article. If the conductive article is electrically isolated the eddy currents are dissipated by Joule heating of the conductive article. In an aerosol-generating system that operates by heating an aerosol-forming substrate, the aerosol-forming substrate is typically not itself sufficiently electrically conductive to be inductively heated in this way. So in the embodiments shown in the figures a susceptor element is used as the conductive article that is heated and the aerosol-forming substrate is then heated by the susceptor element by thermal conduction, convention and/or radiation. If a ferromagnetic susceptor element is used, heat may also be generated by hysteresis losses as the magnetic domains are switched within the susceptor element.

The embodiments described each use an inductor coil to generate a time varying magnetic field. The inductor coil is designed so that it does not undergo significant Joule heating. In contrast the susceptor element is designed so that there is significant Joule heating of the susceptor.

FIG. 1 is a schematic illustration of an aerosol-generating system in accordance with a first embodiment. The system comprises device 100 and a cartridge 200. The device comprises main housing 101 containing a lithium iron phosphate battery 102 and control electronics 104. The main housing 101 also defines a cavity 112 into which the cartridge 200 is received. The device also includes a mouthpiece portion 120 including an outlet 124. The mouthpiece portion is connected to the main housing 101 by a hinged connection in this example but any kind of connection may be used, such as a snap fitting or a screw fitting. Air inlets 122 are defined between the mouthpiece portion 120 and the main body 101 when the mouthpiece portion is in a closed position, as shown in FIG. 1.

Figure 3:
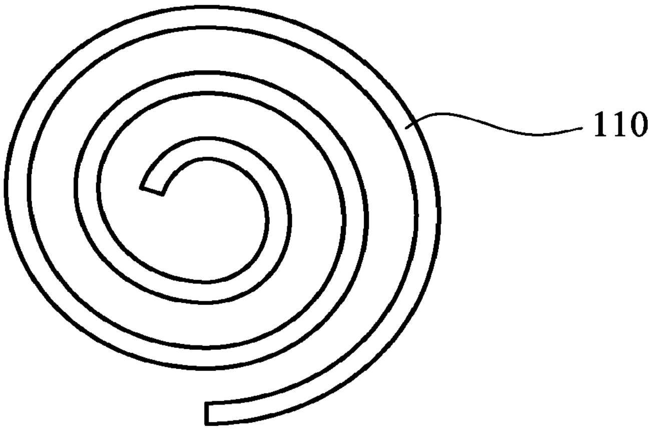
FIG. 3 shows the inductor coil of FIG. 1.

Within the mouthpiece portion is a flat spiral inductor coil 110. The coil 110 is formed by stamping or cutting a spiral coil from a sheet of copper. The coil 110 is more clearly illustrated in FIG. 3. The coil 110 is positioned between the air inlets 122 and the air outlet 124 so that air drawn through the inlets 122 to the outlet 124 passes through the coil. The coil may be sealed within a protective, corrosion resistant coating or enclosure.

Figure 2:
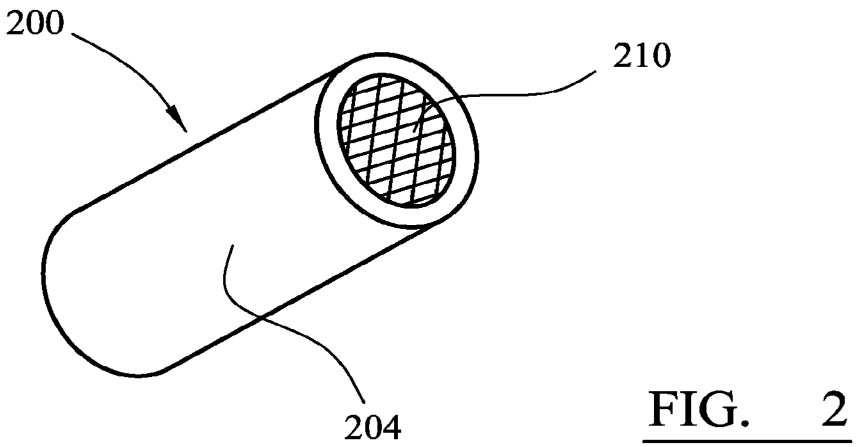
FIG. 2 shows the cartridge of FIG. 1.
Figure 17:
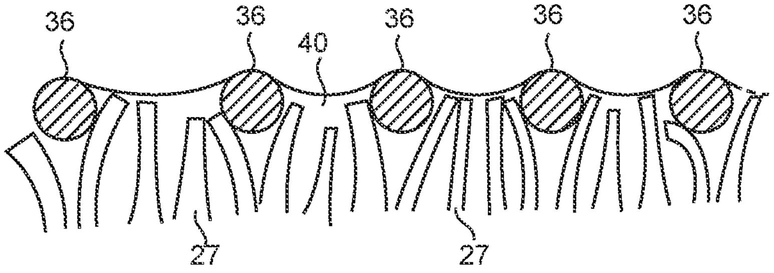
FIG. 17 is a schematic illustration showing a portion of the cartridge of FIG. 2.

The cartridge 200 comprises a cartridge housing 204 holding a capillary material and filled with liquid aerosol-forming substrate. The cartridge housing 204 is fluid impermeable but has an open end covered by a permeable susceptor element 210. The cartridge 200 is more clearly illustrated in FIG. 2. The susceptor element 210 in this embodiment comprises a ferrite mesh, comprising a ferrite steel. The aerosol-forming substrate can form a meniscus in the interstices of the mesh. This is shown, for example, in FIG. 17, which depicts portions 36 of a cross section of the susceptor element 210 with a capillary material 27 extending into interstices of the susceptor element 210 and a meniscus 40 formed therebetween by the liquid aerosol-forming substrate. Another option for the susceptor is a graphite fabric, having an open mesh structure.

When the cartridge 200 is engaged with the device and is received in the cavity 112, the susceptor element 210 is positioned adjacent the flat spiral coil 110. The cartridge 200 may include keying features to ensure that it cannot be inserted into the device upside-down.

In use, a user puffs on the mouthpiece portion 120 to draw air though the air inlets 122 into the mouthpiece portion 120 and out of the outlet 124 into the user's mouth. The device includes a puff sensor 106 in the form of a microphone, as part of the control electronics 104. A small air flow is drawn through sensor inlet 121 past the microphone 106 and up into the mouthpiece portion 120 when a user puffs on the mouthpiece portion. When a puff is detected, the control electronics provide a high frequency oscillating current to the coil 110. This generates an oscillating magnetic field as shown in dotted lines in FIG. 1. An LED 108 is also activated to indicate that the device is activated. The oscillating magnetic field passes through the susceptor element, inducing eddy currents in the susceptor element. The susceptor element heats up as a result of Joule heating and hysteresis losses, reaching a temperature sufficient to vapourise the aerosol-forming substrate close to the susceptor element. The vapourised aerosol-forming substrate is entrained in the air flowing from the air inlets to the air outlet and cools to form an aerosol within the mouthpiece portion before entering the user's mouth. The control electronics supplies the oscillating current to the coil for a predetermined duration, in this example five seconds, after detection of a puff and then switches the current off until a new puff is detected.

Figure 4:
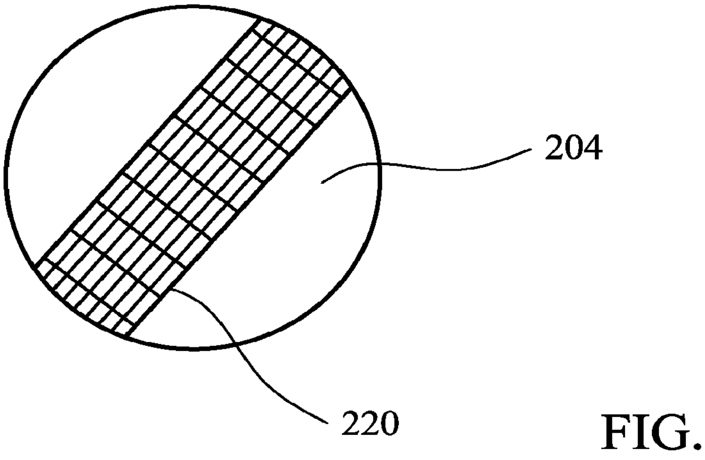
FIG. 4 shows an alternative susceptor element for the cartridge of FIG. 2.
Figure 5:
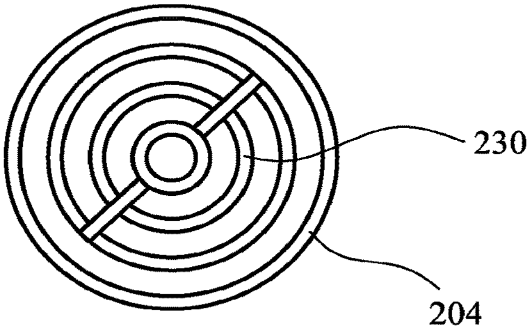
FIG. 5 shows a further alternative susceptor element for the cartridge of FIG. 1.

It can be seen that the cartridge has a simple and robust design, which can be inexpensively manufactured as compared to the cartomisers available on the market. In this embodiment, the cartridge has a circular cylindrical shape and the susceptor element spans a circular open end of the cartridge housing. However other configurations are possible. FIG. 4 is an end view of an alternative cartridge design in which the susceptor element is a strip of steel mesh 220 that spans a rectangular opening in the cartridge housing 204. FIG. 5 is an end view of another alternative susceptor element. In FIG. 5 the susceptor is three concentric circles joined by a radial bar. The susceptor element spans a circular opening in the cartridge housing.

Figure 6:
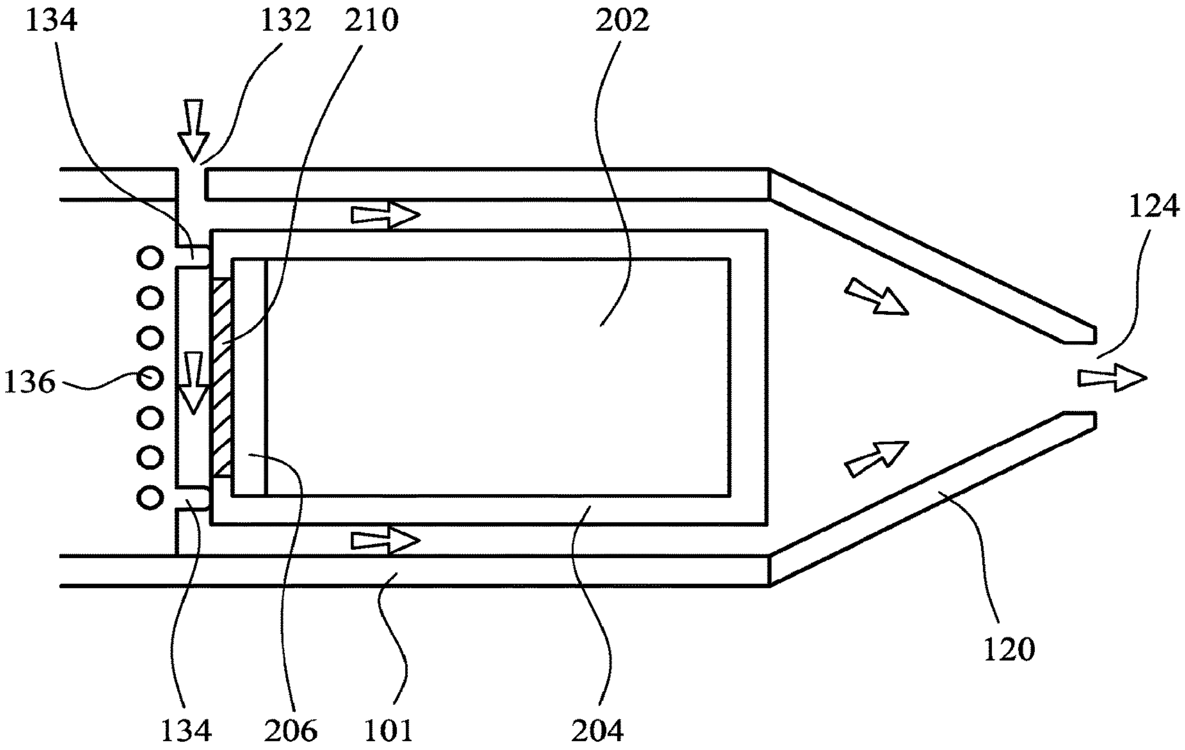
FIG. 6 is a schematic illustration of a second embodiment, using a flat spiral inductor coil.

FIG. 6 illustrates a second embodiment. Only the front end of the system is shown in FIG. 6 as the same battery and control electronics as shown in FIG. 1 can be used, including the puff detection mechanism. In FIG. 6 the flat spiral coil 136 is positioned in the main body 101 of the device at the opposite end of the cavity to the mouthpiece portion 120 but the system operates in essentially the same manner Spacers 134 ensure that there is an air flow space between the coil 136 and the susceptor element 210. Vapourised aerosol-forming substrate is entrained in air flowing past the susceptor from the inlet 132 to the outlet 124. In the embodiment shown in FIG. 6, some air can flow from the inlet 132 to the outlet 124 without passing the susceptor element. This direct air flow mixes with the vapour in the mouthpiece portion speeding cooling and ensuring optimal droplet size in the aerosol.

In the embodiment shown in FIG. 6 the cartridge is the same size and shape as the cartridge of FIG. 1 and has the same housing and susceptor element. However, the capillary material within the cartridge of FIG. 6 is different to that of FIG. 1. There are two separate capillary materials 202, 206 in the cartridge of FIG. 6. A disc of a first capillary material 206 is provided to contact the susceptor element 210 in use. A larger body of a second capillary material 202 is provided on an opposite side of the first capillary material 206 to the susceptor element. Both the first capillary material and the second capillary material retain liquid aerosol-forming substrate. The first capillary material 206, which contacts the susceptor element, has a higher thermal decomposition temperature (at least 160° C. or higher such as approximately 250° C.) than the second capillary material 202. The first capillary material 206 effectively acts as a spacer separating the heater susceptor element, which gets very hot in use, from the second capillary material 202 so that the second capillary material is not exposed to temperatures above its thermal decomposition temperature. The thermal gradient across the first capillary material is such that the second capillary material is exposed to temperatures below its thermal decomposition temperature. The second capillary material 202 may be chosen to have superior wicking performance to the first capillary material 206, may retain more liquid per unit volume than the first capillary material and may be less expensive than the first capillary material. In this example the first capillary material is a heat resistant element, such as a fibreglass or fibreglass containing element and the second capillary material is a polymer such as high density polyethylene (HDPE), or polyethylene terephthalate (PET).

Figure 7:
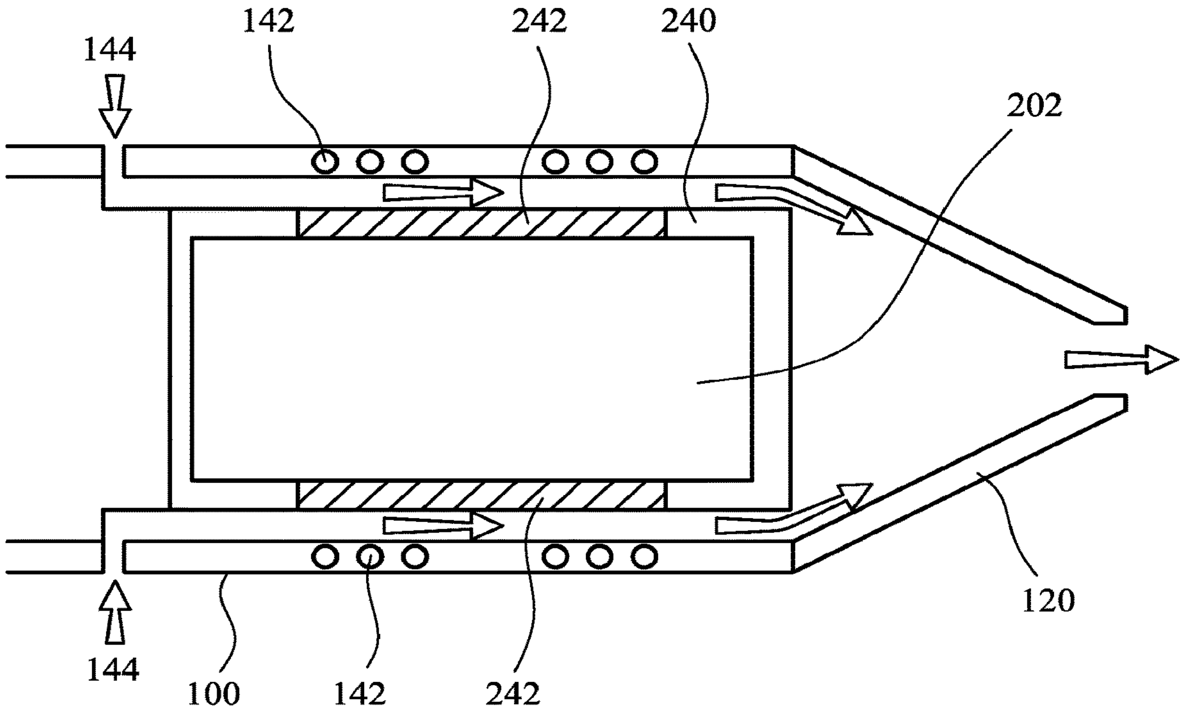
FIG. 7 is a schematic illustration of a third embodiment, using flat spiral inductor coils.
Figure 8:
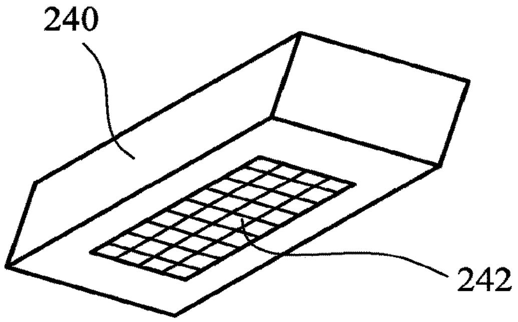
FIG. 8 shows the cartridge of FIG. 7.
Figure 9:
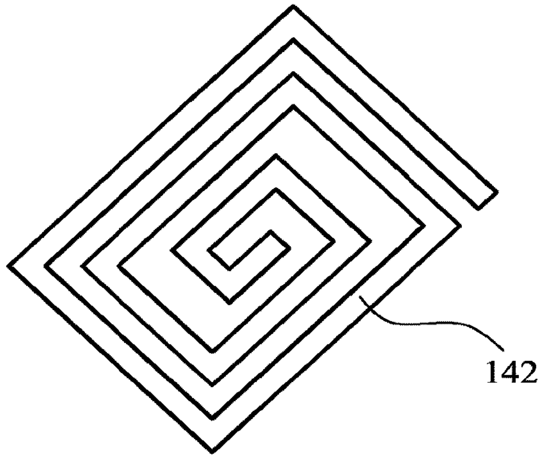
FIG. 9 shows the inductor coil of FIG. 7.

FIG. 7 illustrates a third embodiment. Only the front end of the system is shown in FIG. 7 as the same battery and control electronics as shown in FIG. 1 can be used, including the puff detection mechanism. In FIG. 7 the cartridge 240 is cuboid and is formed with two strips of the susceptor element 242 on opposite side faces of the cartridge. The cartridge is shown alone in FIG. 8. The device comprises two flat spiral coils 142 positioned on opposite sides of the cavity so that the susceptor element strips 242 are adjacent the coils 142 when the cartridge is received in the cavity. The coils 142 are rectangular to correspond to the shape of the susceptor strips, as shown in FIG. 9. Airflow passages are provided between the coils 142 and susceptor strips 242 so that air from inlets 144 flows past the susceptor strips towards the outlet 124 when a user puffs on the mouthpiece portion 120.

As in the embodiment of FIG. 1, the cartridge contains a capillary material and a liquid aerosol-forming substrate. The capillary material is arranged to convey the liquid substrate to the susceptor element strips 242.

Figure 10:
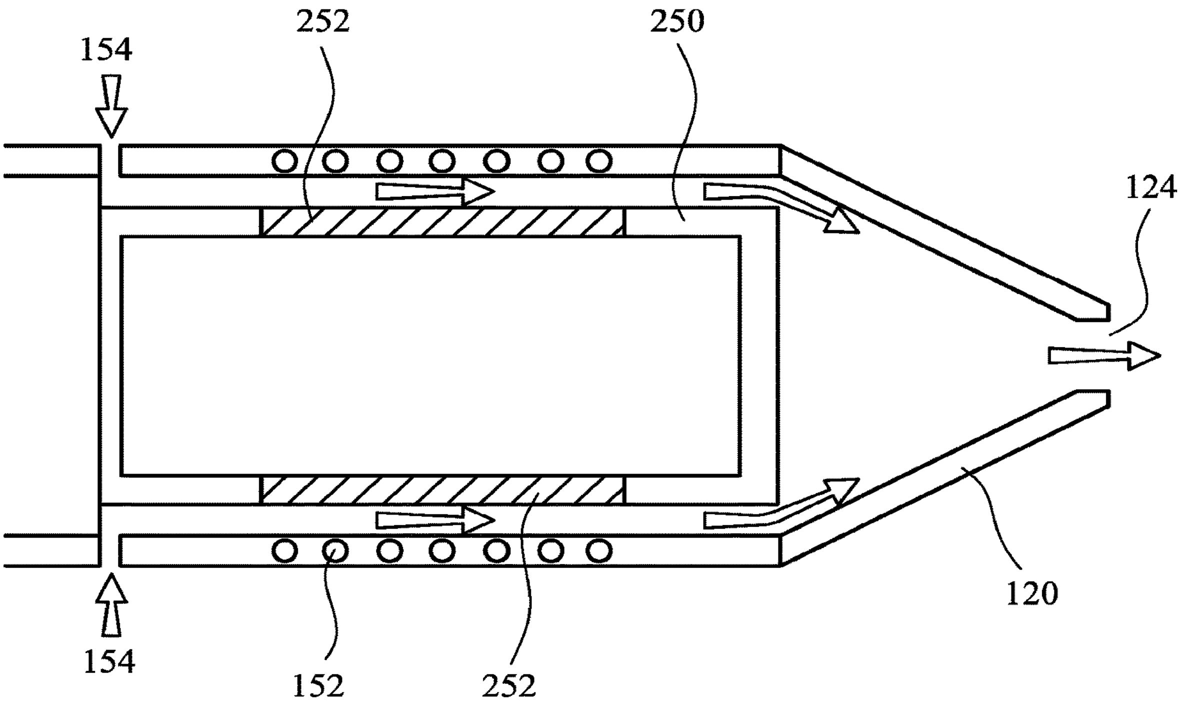
FIG. 10 is a schematic illustration of a fourth embodiment.

FIG. 10 is a schematic illustration of a fourth embodiment. Only the front end of the system is shown in FIG. 10 as the same battery and control electronics as shown in FIG. 1 can be used, including the puff detection mechanism.

Figure 11:
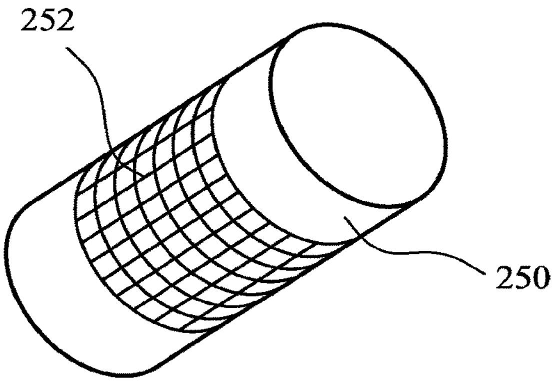
FIG. 11 shows the cartridge of FIG. 10.
Figure 12:
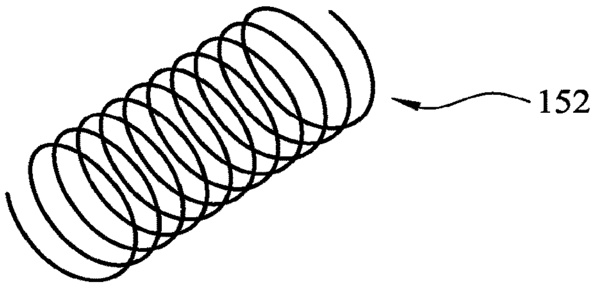
FIG. 12 shows the coil of FIG. 10.

In FIG. 10 the cartridge 250 is cylindrical and is formed with a band shaped susceptor element 252 extending around a central portion of the cartridge. The band shaped susceptor element covers an opening formed in the rigid cartridge housing. The cartridge is shown alone in FIG. 11. The device comprises a helical coil 152 positioned around the cavity so that the susceptor element 252 is within the coil 152 when the cartridge is received in the cavity. The coil 152 is shown alone in FIG. 12. Airflow passages are provided between the coil 152 and susceptor element 252 so that air from inlets 154 flows past the susceptor strips towards the outlet 124 when a user puffs on the mouthpiece portion 120.

In use, a user puffs on the mouthpiece portion 120 to draw air though the air inlets 154 past the susceptor element 262, into the mouthpiece portion 120 and out of the outlet 124 into the user's mouth. When a puff is detected, the control electronics provide a high frequency oscillating current to the coil 152. This generates an oscillating magnetic field. The oscillating magnetic field passes through the susceptor element, inducing eddy currents in the susceptor element. The susceptor element heats up as a result of Joule heating and hysteresis losses, reaching a temperature sufficient to vapourise the aerosol-forming substrate close to the susceptor element. The vapourised aerosol-forming substrate passes through the susceptor element and is entrained in the air flowing from the air inlets to the air outlet and cools to form an aerosol within the passageway and mouthpiece portion before entering the user's mouth.

Figure 13:
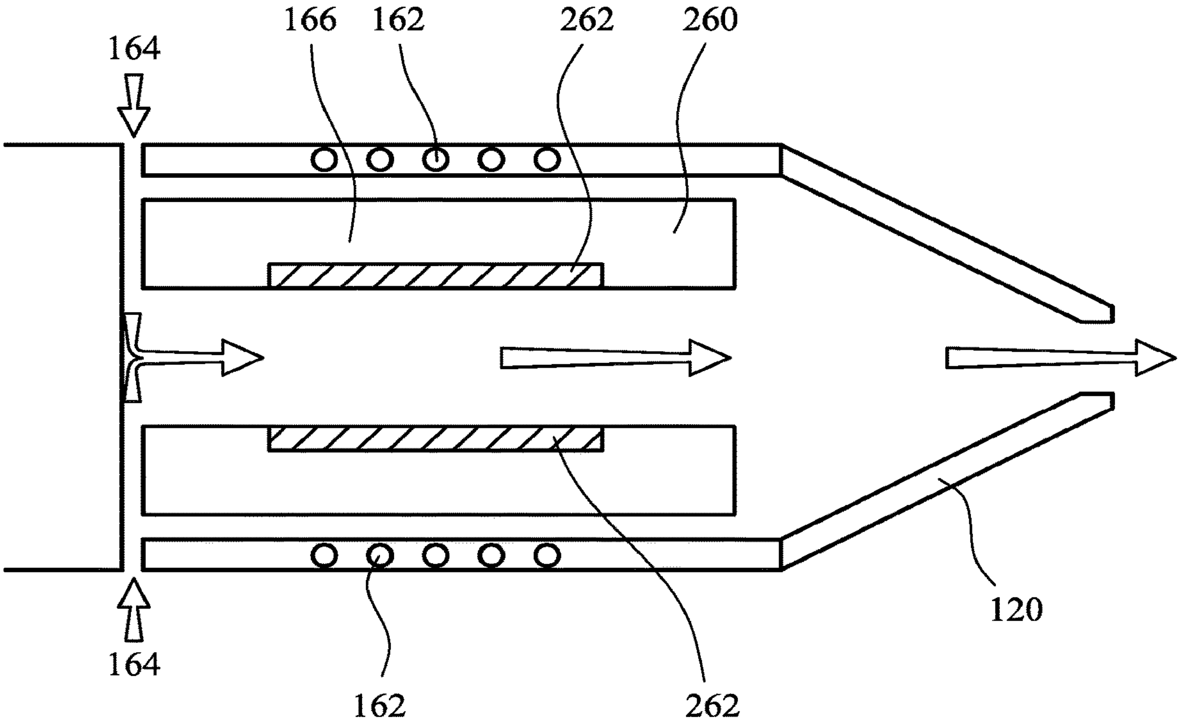
FIG. 13 is a schematic illustration of a fifth embodiment.

FIG. 13 illustrates a fifth embodiment. Only the front end of the system is shown in FIG. 13 as the same battery and control electronics as shown in FIG. 1 can be used, including the puff detection mechanism. The device of FIG. 13 has a similar construction to the device of FIG. 7, with flat spiral coils positioned in a sidewall of the housing surrounding the cavity in which the cartridge is received. But the cartridge has a different construction. The cartridge 260 of FIG. 13 has a hollow cylindrical shape similar to that of the cartridge shown in FIG. 10. The cartridge contains a capillary material and is filled with liquid aerosol-forming substrate. An interior surface of the cartridge 260, i.e. a surface surrounding the internal passageway 166, comprises a fluid permeable susceptor element, in this example a ferrite mesh. The ferrite mesh may line the entire interior surface of the cartridge or only a portion of the interior surface of the cartridge.

In use, a user puffs on the mouthpiece portion 120 to draw air though the air inlets 164 through the central passageway of the cartridge, past the susceptor element 262, into the mouthpiece portion 120 and out of the outlet 124 into the user's mouth. When a puff is detected, the control electronics provide a high frequency oscillating current to the coils 162. This generates an oscillating magnetic field. The oscillating magnetic field passes through the susceptor element, inducing eddy currents in the susceptor element. The susceptor element heats up as a result of Joule heating and hysteresis losses, reaching a temperature sufficient to vapourise the aerosol-forming substrate close to the susceptor element. The vapourised aerosol-forming substrate passes through the susceptor element and is entrained in the air flowing from the air inlets to the air outlet and cools to form an aerosol within the passageway and mouthpiece portion before entering the user's mouth.

Figure 14:
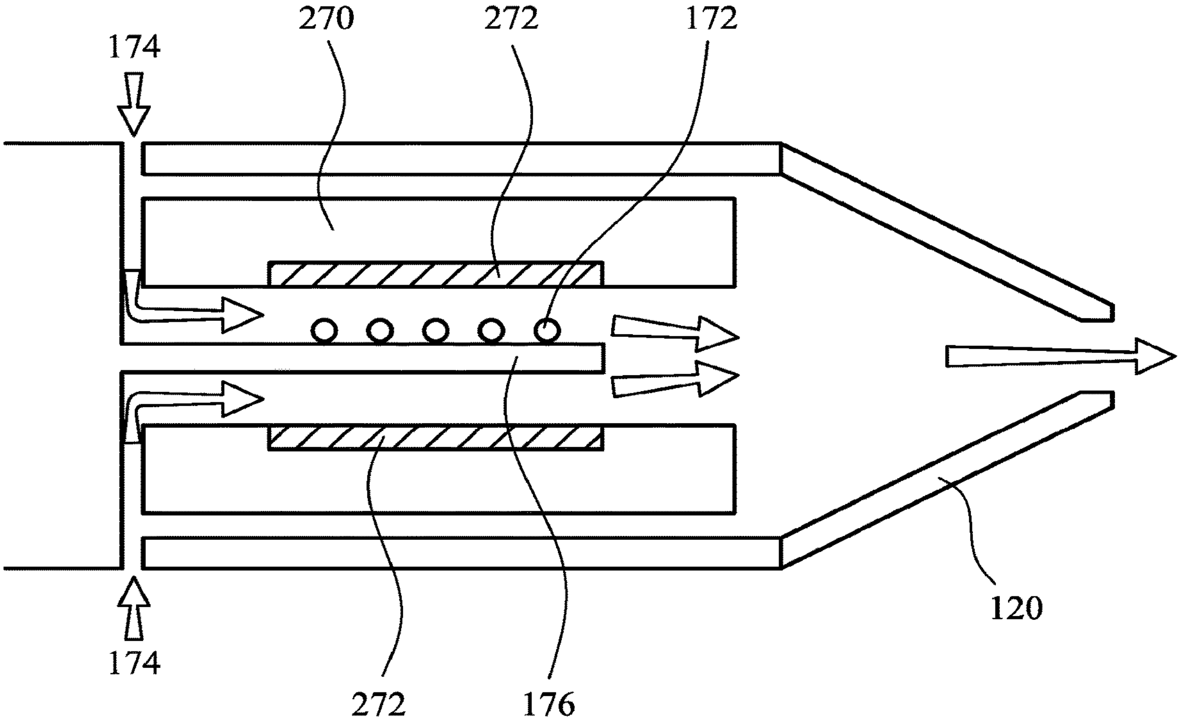
FIG. 14 is a schematic illustration of a sixth embodiment.

FIG. 14 illustrates as sixth embodiment. Only the front end of the system is shown in FIG. 14 as the same battery and control electronics as shown in FIG. 1 can be used, including the puff detection mechanism. The cartridge 270 shown in FIG. 14 is identical to that shown in FIG. 13. However the device of FIG. 14 has a different configuration that includes an inductor coil 172 on a support blade 176 that extends into the central passageway of the cartridge to generate an oscillating magnetic field close to the susceptor element 272.

Figure 15:
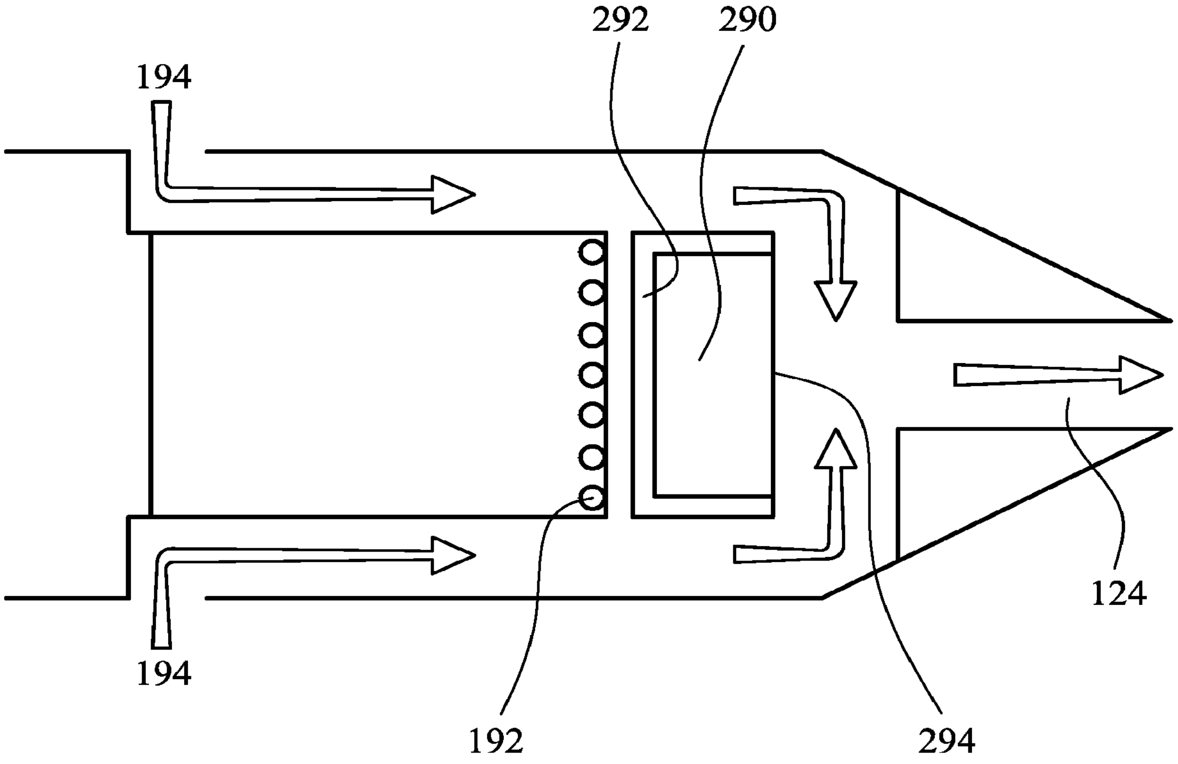
FIG. 15 is a schematic illustration of an eighth embodiment, using a unit dose cartridge.

FIG. 15 illustrates a seventh embodiment. Only the front end of the system is shown in FIG. 15 as the same battery and control electronics as shown in FIG. 1 can be used, including the puff detection mechanism. In the embodiment of FIG. 15 the cartridge is made very small, holding just enough aerosol-forming substrate for a single use, for example for a single smoking session, or for a single dose of medication. The cartridge comprises a susceptor foil housing 292 made of ferrite element, holding aerosol-forming substrate 290. A front end 294 of the housing of the cartridge is perforated so as to be vapour permeable. The cartridge is engaged in a cavity in the device, adjacent a flat spiral inductor coil 192.

In use, a user puffs on the mouthpiece portion 120 to draw air though the air inlets 194 past the vapour permeable portion of the cartridge 294, into the mouthpiece portion 120 and out of the outlet 124 into the user's mouth. When a puff is detected, the control electronics provide a high frequency oscillating current to the coil 192. This generates an oscillating magnetic field. The oscillating magnetic field passes through the susceptor element of the cartridge housing, inducing eddy currents in the susceptor element. The susceptor element heats up as a result of Joule heating and hysteresis losses, reaching a temperature sufficient to vapourise the aerosol-forming substrate. The vapourised aerosol-forming substrate is drawn through the vapour permeable portion of the cartridge 294 by the air flowing from the air inlets to the air outlet and cools to form an aerosol within the mouthpiece portion before entering the user's mouth.

Figure 16A:
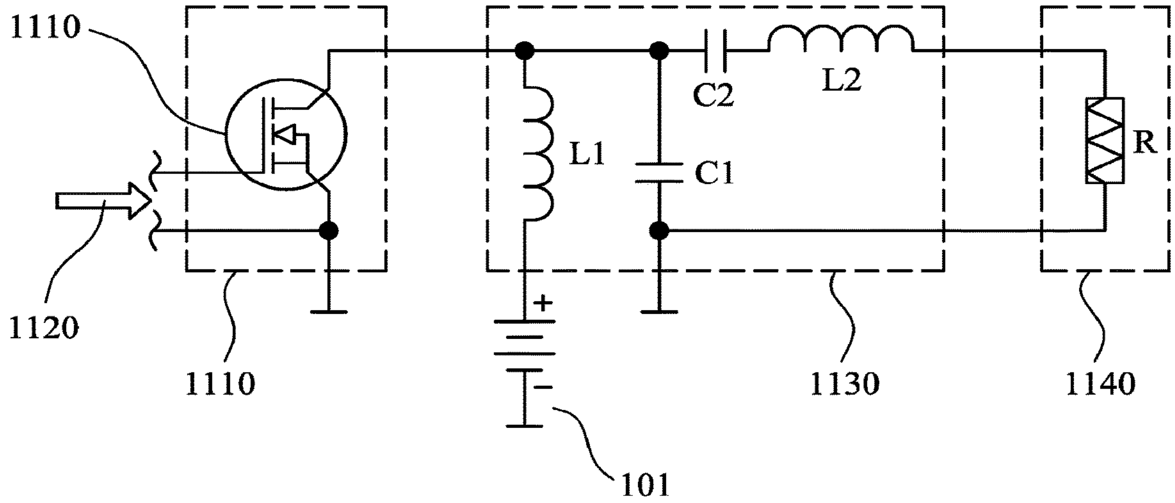
FIG. 16A is a first example of a driving circuit for generating the high frequency signal for an inductor coil.

All of the described embodiments may be driven by the essentially the same electronic circuitry 104. FIG. 16A illustrates a first example of a circuit used to provide a high frequency oscillating current to the inductor coil, using a Class-E power amplifier. As can be seen from FIG. 16A, the circuit includes a Class-E power amplifier including a transistor switch 1100 comprising a Field Effect Transistor (FET) 1110, for example a Metal-Oxide-Semiconductor Field Effect Transistor (MOSFET), a transistor switch supply circuit indicated by the arrow 1120 for supplying the switching signal (gate-source voltage) to the FET 1110, and an LC load network 1130 comprising a shunt capacitor C1 and a series connection of a capacitor C2 and inductor L2. The DC power source, which comprises the battery 101, includes a choke L1, and supplies a DC supply voltage. Also shown in FIG. 16A is the ohmic resistance R representing the total ohmic load 1140, which is the sum of the ohmic resistance $R_{Coil}$ of the inductor coil, marked as L2, and the ohmic resistance $R_{Load}$ of the susceptor element.

Due to the very low number of components the volume of the power supply electronics can be kept extremely small. This extremely small volume of the power supply electronics is possible due to the inductor L2 of the LC load network 1130 being directly used as the inductor for the inductive coupling to the susceptor element, and this small volume allows the overall dimensions of the entire inductive heating device to be kept small.

While the general operating principle of the Class-E power amplifier is known and described in detail in the already mentioned article "Class-E RF Power Amplifiers", Nathan O. Sokal, published in the bimonthly magazine QEX, edition January/February 2001, pages 9-20, of the American Radio Relay League (ARRL), Newington, CT, U.S.A., some general principles will be explained in the following.

Let us assume that the transistor switch supply circuit 1120 supplies a switching voltage (gate-source voltage of the FET) having a rectangular profile to FET 1110. As long as FET 1321 is conducting (in an "on"-state), it essentially constitutes a short circuit (low resistance) and the entire current flows through choke L1 and FET 1110. When FET 1110 is non-conducting (in an "off"-state), the entire current flows into the LC load network, since FET 1110 essentially represents an open circuit (high resistance). Switching the transistor between these two states inverts the supplied DC voltage and DC current into an AC voltage and AC current.

For efficiently heating the susceptor element, as much as possible of the supplied DC power is to be transferred in the form of AC power to inductor L2 and subsequently to the susceptor element which is inductively coupled to inductor L2. The power dissipated in the susceptor element (eddy current losses, hysteresis losses) generates heat in the susceptor element, as described further above. In other words, power dissipation in FET 1110 must be minimized while maximizing power dissipation in the susceptor element.

The power dissipation in FET 1110 during one period of the AC voltage/current is the product of the transistor voltage and current at each point in time during that period of the alternating voltage/current, integrated over that period, and averaged over that period. Since the FET 1110 must sustain high voltage during a part of that period and conduct high current during a part of that period, it must be avoided that high voltage and high current exist at the same time, since this would lead to substantial power dissipation in FET 1110. In the "on-" state of FET 1110, the transistor voltage is nearly zero when high current is flowing through the FET. In the "off-" state of FET 1110, the transistor voltage is high but the current through FET 1110 is nearly zero.

The switching transitions unavoidably also extend over some fractions of the period. Nevertheless, a high voltage-current product representing a high power loss in FET 1110 can be avoided by the following additional measures. Firstly, the rise of the transistor voltage is delayed until after the current through the transistor has reduced to zero. Secondly, the transistor voltage returns to zero before the current through the transistor begins to rise. This is achieved by load network 1130 comprising shunt capacitor C1 and the series connection of capacitor C2 and inductor L2, this load network being the network between FET 1110 and the load 1140. Thirdly, the transistor voltage at turn-on time is practically zero (for a bipolar-junction transistor "BJT" it is the saturation offset voltage $V_o$). The turning-on transistor does not discharge the charged shunt capacitor C1, thus avoiding dissipating the shunt capacitor's stored energy. Fourthly, the slope of the transistor voltage is zero at turn-on time. Then, the current injected into the turning-on transistor by the load network rises smoothly from zero at a controlled moderate rate resulting in low power dissipation while the transistor conductance is building up from zero during the turn-on transition. As a result, the transistor voltage and current are never high simultaneously. The voltage and current switching transitions are time-displaced from each other. The values for L1, C1 and C2 can be chosen to maximize the efficient dissipation of power in the susceptor element.

Figure 16B:
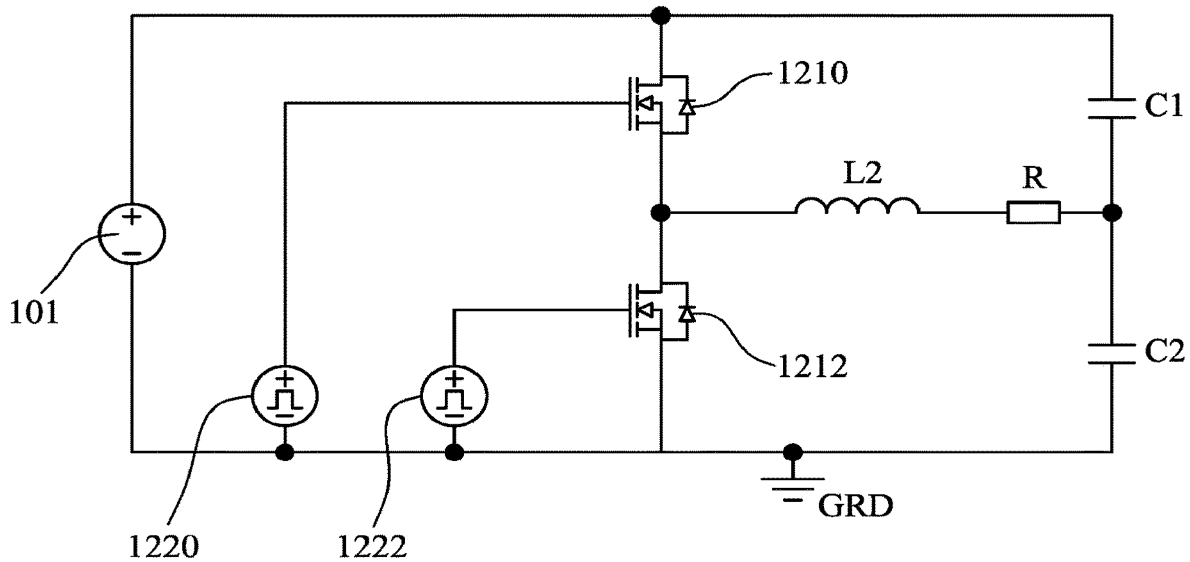
FIG. 16B is a second example of a driving circuit for generating the high frequency signal for an inductor coil.

Although a Class-E power amplifier is preferred for most systems in accordance with the disclosure, it is also possible to use other circuit architectures. FIG. 16B illustrates a second example of a circuit used to provide a high frequency oscillating current to the inductor coil, using a Class-D power amplifier. The circuit of FIG. 16B comprises the battery 101 connected to two transistors 1210, 1212. Two switching elements 1220, 1222 are provided for switching two transistors 1210, 1212 on and off. The switches are controlled at high frequency in a manner so as to make sure that one of the two transistors 1210, 1212 has been switched off at the time the other of the two transistors is switched on. The inductor coil is again indicated by L2 and the combined ohmic resistance of the coil and the susceptor element indicated by R. the values of C1 and C2 can be chosen to maximize the efficient dissipation of power in the susceptor element.

The susceptor element can be made of a material or of a combination of materials having a Curie temperature which is close to the desired temperature to which the susceptor element should be heated. Once the temperature of the susceptor element exceeds this Curie temperature, the material changes its ferromagnetic properties to paramagnetic properties. Accordingly, the energy dissipation in the susceptor element is significantly reduced since the hysteresis losses of the material having paramagnetic properties are much lower than those of the material having the ferromagnetic properties. This reduced power dissipation in the susceptor element can be detected and, for example, the generation of AC power by the DC/AC inverter may then be interrupted until the susceptor element has cooled down below the Curie temperature again and has regained its ferromagnetic properties. Generation of AC power by the DC/AC inverter may then be resumed again.

Other cartridge designs incorporating a susceptor element in accordance with this disclosure can now be conceived by one of ordinary skill in the art. For example, the cartridge may include a mouthpiece portion and may have any desired shape. Furthermore, a coil and susceptor arrangement in accordance with the disclosure may be used in systems of other types to those already described, such as humidifiers, air fresheners, and other aerosol-generating systems.

The exemplary embodiments described above illustrate but are not limiting. In view of the above discussed exemplary embodiments, other embodiments consistent with the above exemplary embodiments will now be apparent to one of ordinary skill in the art.

The invention claimed is:

1. A cartridge for an electrically heatable aerosol-generating system, the electrically heatable aerosol-generating system comprising an aerosol-generating device, the cartridge configured to be used with the aerosol-generating device, wherein the aerosol-generating device comprises a device housing defining a cavity configured to receive at least a portion of the cartridge, an inductor coil positioned around or adjacent to the cavity, and a power supply connected to the inductor coil and configured to provide a high-frequency oscillating current to the inductor coil; the cartridge comprising:

a cartridge housing configured to engage the device housing and containing an aerosol-forming substrate, the cartridge housing having an external surface, at least a portion of the external surface being formed by a fluid permeable susceptor element, the fluid permeable susceptor element being electrically isolated from any other electrically conductive components;

a first capillary material in the cartridge housing in contact with the fluid permeable susceptor element; and a second capillary material in the cartridge housing in contact with the first capillary material, wherein the first capillary material has a higher thermal decomposition temperature than the second capillary material.

2. The cartridge according to claim 1, wherein the thermal decomposition temperature of the first capillary material is at least 160 degrees Celsius.

3. The cartridge according to claim 1, wherein a body of the second capillary material is larger than the first capillary material.

4. The cartridge according to claim 1, wherein the second capillary material retains more liquid per unit volume than the first capillary material.

5. The cartridge according to claim 1, wherein the first capillary material extends into interstices in the fluid permeable susceptor element.

6. The cartridge according to claim 1, wherein the fluid permeable susceptor element is in a form of a sheet that extends across an opening in the cartridge housing.

7. The cartridge according to claim 1, wherein the fluid permeable susceptor element extends around a perimeter of the cartridge housing.

8. The cartridge according to claim 1, wherein the fluid permeable susceptor element comprises a mesh, flat spiral coil, fibres, or fabric.

9. An electrically heatable aerosol-generating system comprising an aerosol-generating device and a cartridge according to claim 1, the aerosol-generating device comprising:

a device housing comprising a cavity configured to receive at least a portion of the cartridge when the device housing is engaged with the cartridge housing;

an inductor coil positioned around or adjacent to the cavity; and a power supply connected to the inductor coil and configured to provide a high-frequency oscillating current to the inductor coil.

10. The electrically heatable aerosol-generating system according to claim 9, wherein the inductor coil is a flat spiral coil.

11. The electrically heatable aerosol-generating system according to claim 9, wherein the cavity has an internal surface, and the inductor coil is positioned on or adjacent a surface of cavity closest to the power supply.

12. The electrically heatable aerosol-generating system according to claim 9, wherein device housing comprises a main body and a mouthpiece portion, the cavity being in the main body and the mouthpiece portion having an outlet through which aerosol generated by the electrically heatable aerosol-generating system can be drawn into a user's mouth, wherein the inductor coil is in the mouthpiece portion.

13. The electrically heatable aerosol-generating system according to claim 9, wherein the inductor coil has a shape matching a shape of the fluid permeable susceptor element.

14. The electrically heatable aerosol-generating system according to claim 9, wherein an airflow passage is provided between inductor coil and the fluid permeable susceptor element when the cartridge housing is engaged with the device housing.

15. The electrically heatable aerosol-generating system according to claim 9, further comprising a plurality of inductor coils.

16. The electrically heatable aerosol-generating system according to claim 9, wherein the aerosol-generating device comprises a first inductor coil and a second inductor coil, the first inductor coil being positioned on an opposite side of the cavity to the second inductor coil, and wherein the first and the second inductor coils are flat spiral coils.

17. The electrically heatable aerosol-generating system according to claim 9, wherein the electrically heatable aerosol-generating system is a handheld smoking system.

* * * * *